US011191276B2

(12) United States Patent
Jones et al.

(10) Patent No.: US 11,191,276 B2
(45) Date of Patent: Dec. 7, 2021

(54) SOLID FORMULATIONS SUITABLE FOR OILFIELD APPLICATIONS

(71) Applicant: RHODIA OPERATIONS, Aubervilliers (FR)

(72) Inventors: Christopher Raymond Jones, Cheslyn Hay (GB); Kevan Hatchman, Wolverhampton (GB); Alan Christopher Fellows, Birmingham (GB)

(73) Assignee: RHODIA OPERATIONS, Aubervilliers (FR)

( * ) Notice: Subject to any disclaimer, the term of this patent is extended or adjusted under 35 U.S.C. 154(b) by 176 days.

(21) Appl. No.: 16/416,899

(22) Filed: May 20, 2019

(65) Prior Publication Data
US 2019/0316027 A1    Oct. 17, 2019

Related U.S. Application Data

(62) Division of application No. 14/355,949, filed as application No. PCT/EP2012/071744 on Nov. 2, 2012, now abandoned.

(30) Foreign Application Priority Data

Nov. 3, 2011 (EP) .................... 11306419

(51) Int. Cl.
| | |
|---|---|
| *C09K 8/035* | (2006.01) |
| *A01N 59/26* | (2006.01) |
| *C09K 8/92* | (2006.01) |
| *C09K 8/60* | (2006.01) |
| *C09K 8/584* | (2006.01) |
| *C09K 8/588* | (2006.01) |
| *E21B 43/12* | (2006.01) |
| *C09K 8/536* | (2006.01) |

(52) U.S. Cl.
CPC .............. *A01N 59/26* (2013.01); *C09K 8/035* (2013.01); *C09K 8/536* (2013.01); *C09K 8/584* (2013.01); *C09K 8/588* (2013.01); *C09K 8/602* (2013.01); *C09K 8/92* (2013.01); *E21B 43/121* (2013.01); *C09K 2208/32* (2013.01); *C09K 2208/34* (2013.01)

(58) Field of Classification Search
CPC ........ A01N 59/26; C09K 8/035; C09K 8/536; C09K 8/602; C09K 8/92
See application file for complete search history.

(56) References Cited

U.S. PATENT DOCUMENTS

| | | | | |
|---|---|---|---|---|
| 3,219,115 A | * | 11/1965 | Hower ..................... | C09K 8/94 175/69 |
| 3,251,417 A | * | 5/1966 | Holman ................... | C09K 8/52 166/246 |
| 2010/0048429 A1 | * | 2/2010 | Dobson, Jr. ............ | C09K 8/685 507/212 |
| 2011/0284587 A1 | * | 11/2011 | Galazka ................... | A61Q 5/10 424/70.1 |
| 2013/0029883 A1 | * | 1/2013 | Dismuke ................ | C09K 8/703 507/219 |
| 2013/0045898 A1 | * | 2/2013 | Witters ................ | C08G 83/005 507/202 |

* cited by examiner

*Primary Examiner* — Alicia Bland
(74) *Attorney, Agent, or Firm* — Osha Bergman Watanabe & Burton LLP

(57) ABSTRACT

The present invention relates to a solid formulation of soap stick type comprising a primary surfactant, at least one binding agent and at least one dispersant that may especially be an amphoteric surfactant, optionally with additives. The present invention also relates to uses of said formulation, especially for oilfield applications, e.g. for gas well deliquification applications.

16 Claims, No Drawings

SOLID FORMULATIONS SUITABLE FOR OILFIELD APPLICATIONS

This application is a divisional application of U.S. application Ser. No. 14/355,949, filed May 2, 2014, which is a U.S. national stage entry under 35 U.S.C. § 371 of International Application No. PCT/EP2012/071744 filed Nov. 2, 2012, which claims priority to EP Application No. 11306419.0 filed on Nov. 3, 2011. The entire contents of these applications are explicitly incorporated herein by this reference.

The present invention concerns new solid formulations, such as soap sticks, comprising at least one surfactant, that are especially suitable for oilfield applications.

The productivity of natural gas wells deteriorates over a period of time as a result of a loss in reservoir pressure. It may lead to flooding as a consequence of the ingress of water and hydrocarbon (condensate) from the surrounding formation. Symptoms of flooding include a drop in the gas velocity or erratic flow caused by liquid aerosols condensing and accumulating on the sides of the casing to form 'slugs' of fluid. If the liquid is not removed from the well, the fluid level and hydrostatic pressure will increase over a period of time until it reaches a point where it will effectively block the flow of gas to the surface, and from the reservoir into the well. Well productivity can be improved or maintained by the implementation of artificial lift programmes and the preferred method will depend to some extent on well construction. These solutions include mechanical methods such as plunger and hydraulic lift, or chemical treatments, in particular Foam Assisted Lift (FAL)('Solving gas well liquid loading problems', J F Lea, H V Nickens, SPE; Distinguished Author Series, 2004, April, 30).

Surfactants are key components of the chemical formulations (foamers) used in FAL because they are cost effective, offer a number of performance benefits including environmental, corrosion inhibition, thermal and chemical stability. The complexity of foamer formulations vary, according to operational requirements, and are available in both liquid and solid formats, i.e. soap sticks. They may contain, besides surfactants, components such as dispersants, winterising agents (alcohols and glycols), scale and paraffin wax inhibitors, and corrosion inhibitors. Furthermore it is important for the surfactants to exhibit good compatibility with these ingredients. Liquid formulations offer a number of advantages compared to soap sticks such as ease of use (batch or continuous injection), controlled application (automated dosing) and the ability to deliver the formulation to the affected region. Injecting the liquid formulation directly into flooded zone also permits intimate mixing and eliminates the uncertainty of delivering the chemical, especially for situations where the well is highly deviated. This is one of the major issues faced when soap sticks are used as they can become stuck in bends or horizontal sections of the well bore. Soap sticks, as their name infers, are concentrated surfactant formulations cast in a solid form. They tend to be cylindrical shaped, have a specific gravity around 1.0-1.5 and their composition can be tailored to meet specific performance criteria, e.g. high melting points or carriers for the controlled release of biocides, corrosion and scale inhibitors. They are used to assess how flooded wells respond to treatment with surfactants to improve gas production These formulations are a convenient method of dosing the surfactant (foamer) into the well bore. They are injected by firing the sticks from a dispenser attached to the well head as disclosed in U.S. Pat. No. 5,515,924 or US2003/010504.

The sticks are allowed to fall under gravity to the bottom of the well. The melting point of the stick should be high enough to withstand disintegration (contact with liquid aerosols) until it reaches the flooded zones.

The compositions of soap sticks vary and their performance attributes may be limited; active content (dosage), physical stability, emulsification problems, poor aquatic toxicity and biodegradability, or the foam performance deteriorates in the presence of high levels of dissolved electrolytes. Solid dose products disclosed in prior art require the active ingredients to be mutually compatible in the molten state which limits their formulation flexibility. Compositions are restricted to ingredients such as nonionic surfactants which have a waxy consistency and a relatively high melting point to avoid softening of the stick during storage in warm conditions, i.e. 40° C. Furthermore, these ingredients may have poor biodegradability or poor aquatic toxicity which limits their acceptance.

The aim of the present invention is thus to provide with a new stick formulation that copes with engineering and demanding performance criteria.

The aim of the present invention is also to deliver high active particulate surfactants such as anionic and amphoteric surfactants in an easy to use format for gas well deliquification or other oilfield applications, e.g. pipeline treatments.

The aim of the present invention is to provide with a formulation which may be cast in a variety of shapes to cope with different types of well construction or to meet soap stick launcher requirements.

The aim of the present invention is to provide with a flexible formulation being compatible with a wide range of formulation ingredients.

Thus, the present invention relates to a solid formulation comprising a primary surfactant, at least one binding agent and at least one dispersant. In said solid formulation, the dispersant generally allows a dispersion of at least the primary surfactant in the solid formulation, and i.a. a dispersion of the primary surfactant in the binding agent.

According to the present invention, the solid formulation is generally in the form of a soap stick. According to a specific embodiment, such a formulation is free from nonylphenol ethoxylates.

The solid formulations of the present invention will be referred herein as 'soap sticks' or 'foam compositions' or 'foam stick compositions'.

The present invention thus relates in particular to a soap stick comprised of a high active particulate amphoteric surfactant dispersed in a wax base.

Preferably, these soap sticks are cast in to a spherical shape for ease of dosing. This shape is advantageous in that it allows the 'balls' to navigate any deviations quite easily.

The present invention is advantageous in that it does not require the physical form of the main ingredients to be present in the molten state and therefore to be compatible with each other. In addition, prior art does not refer to the use of a polymeric dispersant to suspend a solid material to maintain the homogeneity of the dispersion as it cools and solidifies. The examples disclosed in the relevant prior art does not provide an adequate solution and therefore it is anticipated that any solids present may be prone to separation leading to variability in the overall quality and performance of the formulation. Preventing the separation of the solid ingredients in the molten state is important as it ensures a product with consistent performance attributes is obtained.

The exact nature of the primary surfactant present in the formulations of the invention is not specifically limited. Generally speaking, almost all kind of surfactant may be used, including nonionic, anionic, cationic and amphoteric surfactants. Anionic and amphoteric surfactants are especially suitable.

Mixture of surfactants may also be contemplated. In that case, it is preferable that the mixture is a spray dried mixture (obtained by spray drying a solution/dispersion of a mixture of surfactants). More generally, mixtures obtainable by mixing two or more surfactants in a liquid medium and then removing this liquid medium are suitable according to the instant invention.

The primary surfactant of the formulations according to the invention may e.g. be a mixture including (i) at least two anionic surfactants; or (ii) at least one amphoteric and at least one anionic surfactant. Such mixture may include additional nonionic surfactants such as alcohol ethoxylates, that generally aid dissolution of the other surfactants and boost their performance.

According to an advantageous embodiment, the primary surfactant is chosen from amphoteric surfactants, preferably chosen from the group consisting of: alkyl amidopropyl sultaines, (C8-C18) alkyl amidopropyl betaines, alkyl amphohydroxypropyl sulfonates, alkyl ampho(di)acetates, and mixtures thereof.

For example, the primary surfactant may be chosen from (C8-C18) alkyl amidopropyl betaines.

According to a specific embodiment, the primary surfactant of the formulations of the invention is, or contains, a lauramidopropyl betaine. Especially it may be an alkyl amidopropyl betaine based on a narrow cut of lauric fatty acid (>95%).

Thus, the present invention relates to a solid formulation comprising a primary surfactant, at least one binding agent and at least one dispersant, wherein said primary surfactant may e.g. be an alkyl amidopropyl betaine such as lauramidopropyl betaine as illustrated in the appended examples.

According to a specific embodiment that will be described in more details herein, the primary surfactant is a lauramidopropyl betaine, preferably obtained by spray drying, with an average particulate size of 10-30 microns, for example of 20 microns. MACKAM 1200 (85% active) commercialized by Rhodia is especially suitable.

Amphoteric surfactants, such as lauramidopropyl betaine exhibit excellent liquid unloading performance and foam stability. They are able to cope with variations in water quality (i.e. water hardness) and tolerate high levels of condensate (hydrocarbon). Furthermore, the surfactants are compatible with ionic and nonionic surfactants and therefore it is relatively straight forward to spray dry mixtures of these surfactants to produce a high active solid which could be incorporated into the formulation.

According to other possible embodiments, not explicitly exemplified herein, the primary surfactant may be an anionic surfactant, preferably a high active powder grade of an anionic surfactant. Examples of suitable anionic surfactants include acyl sarcosinates, acyl taurates, fatty acid isethionates, alkyl and alkyl ether sulfates, α-olefin sulfonates, α-sulfo methyl esters and linear alkyl benzene sulfonates, preferably (but not necessarily) in a spray dried form.

Whatever the exact nature of the used primary surfactant, the solid formulation of the invention comprises the three following main components: a primary, a dispersant and a binding agent.

The soap stick of the invention has the capability to deliver a high active solid particulate surfactant (primary surfactant) in a solid medium such as a non-aqueous wax matrix (binding agent). A dispersant is required to produce a homogeneous dispersion of the primary surfactant in the solid medium, especially during the preparation of the formulation, wherein the solid medium is generally used in a molten form (typically a polymeric dispersant is used when the binding agent is a molten wax). These components are compatible with a wide range of ingredients and are easily adapted for a wide range of oilfield applications, e.g. controlled release vehicle for scale and corrosion inhibitors. The formulations of the invention are especially flexible as they are not reliant on a limited number of ingredients to produce a stick with the required physical attributes.

The blend of the primary surfactant with at least one binding agent (e.g. waxes) especially improves the mechanical properties. The binding agent is preferably present at levels that impart the desirable strength (to withstand compaction during storage and impact collision during use), reduce friability, provide lubrication (mould release) and that have preferably no detrimental effect on the overall foam performance. The hardness of the soap sticks can be determined using methods to assess the properties of solid materials (WO2004/089319 or US2007/166254); as described in ASTM D-5, 'Penetration of Bituminous Materials' and ASTM D1321-10 'Standard Test Method for Needle Penetration of Petroleum Waxes'.

The hardness of the soap stick may be assessed by the vertical penetration of a standard needle expressed as the distance to the nearest tenth of a millimeter into the material. The test is carried out under fixed conditions; applied load (e.g. 50 g), time period (e.g. 10 sec±0.1 sec) and constant temperature (20-25° C.). Hard materials are characterised by low penetrometer results. Another technique that can be employed to determine the hardness of the soap stick is the texture analyser (e.g. supplied by Texture Technologies). The instrument is used to measure the peak force required to move a standard 45° cone 10 mm into the material at a fixed rate and constant temperature. The hardness of the material is related to the magnitude of the peak force required to penetrate the solid.

The crystallisation rate of the binding agent is critical as it helps to stop the sedimentation of the solids as the formulation cools in the moulds. The crystalline structure formed by the binder is important as it also affects the dissolution rate of the stick in the fluid (melting point), prevents syneresis of liquid components (lubricant oils) and influences the degree of shrinkage of the solid in the mould as it cools to ambient temperature. Slight shrinkage of the solid product however is desirable as it permits the release of the formulation from the mould.

According to an advantageous embodiment, the binding agent of the solid formulation of the present invention is chosen from the group consisting of: C16-C24 fatty alcohols, C16-C24 fatty alcohol ethoxylates, fatty acid alkanolamides, fatty acids, natural waxes and resins, high molecular weight polyethylene glycols, polyethylene waxes, mineral and petrolatum waxes, microcrystalline waxes, and mixtures thereof.

As C16-C24 fatty alcohols, one may cite cetostearyl, stearyl or behenyl alcohols.

As C16-C24 fatty alcohol ethoxylates, one may cite cetyl/oleyl 20 to 50 mole ethoxyate. According to an embodiment, the binding agent may comprise a mixture of a polyethylene glycol and alcohol ethoxylates. In such an embodiment, the ehtoxylates may be added to the polyethylene glycol wax to control the dissolution rate of the solid.

As fatty acid alkanolamides, one may cite C12-C22 fatty acids reacted with monoethanolamine or monoisopropylamine.

Suitable alkanolamides include MACKAMIDE LMA commercialized by Rhodia.

When the binding agent is chosen from fatty acids, one may cite in particular natural soap bases (alkali metal salts). Examples include soaps derived from palm oil, coconut oil, rapeseed (erucic acid), castor oil and olive oil.

As natural waxes and resins, montan wax (lignite) is preferred. Waxes include hydrogenated castor oil, candelilla, beeswax, carnauba, rice bran, palm, soy and rapeseed. Materials are available with a range of melting points, preferably in the temperature range 60-100° C. The congealing points are preferred at temperatures greater than 50° C., typically 60-90° C., as there is a possibility the individual soap bars can stick together in warm conditions, unless they are individually wrapped in water soluble packaging;

According to a specific embodiment, the binding agent is chosen from high molecular weight polyethylene glycols. In particular, these polyethylene glycols are chosen from PEG 1500, PEG 3000 or PEG 4000 (e.g. Pluriol E series, available from BASF) or Carbowax® (ex Dow Chemicals)). The melting point and mechanical strength imparted by the glycol can be further manipulated by the inclusion of lower molecular weight polymers, i.e. PEG 200-1000. The inclusion of the lower molecular weight homologues lowers the melting point of the formulation and therefore aids its dissolution in the brine. It is imperative the amount used does not greatly affect the impact resistance because it is possible for the moulded product to stick together during handling at ambient temperatures if too much is added. It is recommended inclusion levels of the low molecular PEGS be restricted to 40% of the binder composition, preferably 1-30%, more preferably 1-20%.

According to an embodiment, the glycols may be added to a soap base as plasticisers to aid the processing of the formulation and to improve the mould release properties (i.e. shrinkage).

As mineral and petrolatum waxes, one may mention ozokerite and ceresine.

The binding agent may also be chosen from microcrystalline waxes (petrolatum). In such an embodiment, the wax forms small crystals which will facilitate the dissolution of the stick and control the release of the actives as it melts.

According to an advantageous embodiment, the binding agent is chosen from the group consisting of: fatty acid alkanolamides, C16-C24 fatty alcohol ethoxylates, high molecular weight polyethylene glycols, natural waxes and resins, in particular vegetable waxes, and mixtures thereof.

According to an advantageous embodiment, the binding agent is a fatty acid alkanolamide, such as lauric monoethanolamide, or a high molecular weight polyethylene glycol.

According to an advantageous embodiment, the binding agent is a fatty acid alkanolamide such as lauric monoethanolamide.

According to an advantageous embodiment, the binding agent consists of at least two high molecular weight polyethylene glycols.

According to an advantageous embodiment, the binding agent may comprise at least one fatty acid alkanolamide, such as lauric monoethanolamide, and a high molecular weight polyethylene glycol.

According to a preferred embodiment, the formulation of the invention comprises lauric monoethanolamide as a binding agent.

According to a preferred embodiment, the formulation of the invention may also comprise a natural wax, such as vegetable wax, in particular rapeseed wax.

According to another preferred embodiment, the formulation of the invention comprises a high molecular weight polyethylene glycol such as PEG 1500 or PEG 4000 as a binding agent.

According to another preferred embodiment, the formulation of the invention comprises an alkanolamide or a C16-C24 fatty alcohol ethoxylate as a binding agent, in particular in an amount of 5% to 30% by weight based on the total weight of said formulation.

The formulation of the present invention may also comprise a further binding agent, in particular chosen from vegetable waxes and high molecular weight polyethylene glycols, in particular in an amount of 5% to 30% by weight based on the total weight of said formulation.

According to an advantageous embodiment, the formulation comprises an alkanolamide, such as lauric monoethanolamine, preferably in an amount of 15% to 30% by weight based on the total weight of said formulation.

According to an advantageous embodiment, the formulation comprises a vegetable wax, such as rapeseed wax, preferably in an amount of 3% to 30% by weight based on the total weight of said formulation.

According to another advantageous embodiment, the formulation of the invention comprises an alkanolamide or a high molecular weight polyethylene glycol, together with a vegetable wax. In such an embodiment, the amount of the vegetable wax is comprised from 3% to 6% by weight based on the total weight of said formulation.

It should be mentioned here that the vegetable wax may also have lubricant properties and acts as a mould release agent.

According to a preferred embodiment, the binding agent of the formulation of the present invention comprises lauric monoethanolamide and rapeseed wax.

According to an advantageous embodiment, the binding agents are added at a level of 1-60% w/w of the formulation.

According to an embodiment, the formulation of the present invention comprises from 20% to 45% by weight based on the total weight of the formulation.

The dispersant of the solid formulation of the present invention is advantageously a polymeric surfactant chosen from the group consisting of: hyper branched polymers (e.g. Hypermer range ex Croda Chemicals), poly fatty acid esters, ethylene oxide block copolymers of poly fatty acid, polymers based on polyisobutylene succinic anhydride, and mixtures thereof. The dispersant may also be selected from polymers commonly used in agrochemical formulations, e.g. Tersperse (ex Huntsman). Examples include naphthalene sulfonate formaldehyde condensates, acrylic graft copolymers, polyester condensates and amine condensates.

Said dispersant is used i.a. to disperse the solid in the molten wax base to prevent physical separation during casting.

Polymeric surfactants of interest are those that are active at the solid/organic phase interface. Surfactant chemistries of interest were those with head groups which adsorb strongly to the solid substrate and the polymeric backbone chain had a strong affinity for the organic phase (molten binding agent). Their primary function is to disperse the solid in the continuous phase (steric hinderence) to prevent phase separation during cooling. Examples include hyper branched polymers ('Hypermers' or Atlox® from Croda or Agrimer range from ISP). Examples include: Hypermer® PS1, Hypermer® PS2, Hypermer® PS3, Hypermer® A60 (polyester non-ionic surfactant, MW~15000), Hypermer® B246 (block copolymer of PFA (poly 12-hydroxystearic acid) and ethylene oxide (EO) with a MW of about 7500), Hypermer® B261 (block copolymer of PFA and EO with a MW of about 9600), Atlox® LP1 (anionic polymeric surfactant), Atlox® LP2, Atlox® LP4, Atlox® LP5, Atlox® LP6, and Atlox® 4912.

According to an advantageous embodiment, poly fatty acid (PFA) esters such as those based on polyhydroxystearic acid, i.e. Hypermer® LP1 (polymer backbone based on 12-hydroxystearic acid with a d.p.~9), are used as the dispersant for the formulations comprising a vegetable wax as binding agent.

According to another advantageous embodiment, EO block copolymers of PFA (e.g. Hypermer® B261, HLB~8, mw~9600) are suitable dispersant systems for the formulations comprising a polyethylene glycol as binding agent.

Polymers based on polyisobutylene succinic anhydride, i.e. PIBSA derivatives ('Anfomul' series ex Croda Chemicals or Lubrizol ranges, e.g. Lubrizol 2600 and 8065) may also be used as the dispersant system. Another advantage of using these polymers is they will act as asphaltene dispersants in the presence of condensates and therefore reduce the risk of the polyaromatic compounds stabilising the crude oil emulsion (Pickering dispersions). This may result in emulsification problems in downstream production and therefore will require an additional processing step to separate the hydrocarbons from the brine, i.e. demulsifiers and water clarifiers.

Dispersants used in the manufacture of cosmetic antiperspirant sticks, toilet soap bars or colour cosmetics were also found to aid the dispersion of the primary surfactant such as fatty acids (e.g. 12-hydroxystearic acid) and chelants, i.e. iminosuccinates or phosphonates. Chelants are used as synergists for antioxidants which are used in cosmetic soap bases.

In addition, oil soluble preservatives such as tocopherol acetate (Vitamin E acetate) may be used to extend the storage life of the soap sticks based on natural waxes.

According to an advantageous embodiment, the solid formulation of the present invention comprises a dispersant chosen from: poly-hydroxystearic acid ester, EO/PO block copolymer and PEG diester.

Preferably, said dispersant is Hypermer® LP1 or Hypermer® B261.

In the solid formulations of the present invention, the amount of the dispersant may be comprised from 1% to 5% by weight based on the total weight of the formulation.

According to an embodiment, the solid formulation of the present invention further comprises a weighting agent.

The shape of the solid formulations of the present invention is important as it allows the 'balls' to navigate any deviations quite easily. The specific gravity of the solid 'foam ball' was adjusted with water soluble weighting agents to ensure it would permit intimate mixing in the aqueous phase and to quickly dissolve.

The density of the stick is attenuated with a weighting agent in order for the stick to float on the surface (maximum agitation) or to be immersed in the fluid.

According to a preferred embodiment, the weighting agent of the solid formulations of the present invention is chosen from the group consisting of: barium sulphate, calcium carbonate, dolomite, water-soluble salts of alkali metals, and mixtures thereof.

The weighting agent is used to increase the density. The specific gravities of brines are typically greater than 1.0. The purpose of the weighting agent is to ensure the formulation is fully immersed in the brines to permit intimate contact and allow it to quickly dissolve. Weighting agents commonly used in drilling fluids may be included in the formulation as finely divided powders. Examples include barium sulphate (barite), calcium carbonates (crushed marble) and dolomites. Water soluble salts of alkali metals are also preferred because they improve the dissolution rate of the soap stick, e.g. sodium chloride, potassium chloride, potassium carbonate, sodium carbonate, sodium sulphate, sodium citrate and potassium citrate.

Densities of weighting agents are given in the following table.

| Weighting Agent | Density (g/cm$^3$) |
| --- | --- |
| Sodium Chloride | 2.17 |
| Sodium Carbonate | 2.54 |
| Sodium Sulphate (anhydrous) | 2.66 |
| Sodium Citrate | 1.67 |
| Potassium Chloride | 1.98 |
| Potassium Carbonate | 2.29 |
| Potassium Sulphate | 2.66 |
| Potassium Citrate | 1.98 |
| Calcium Chloride (anhydrous) | 2.15 |
| Calcium Carbonate | 2.83 |

According to an advantageous embodiment, the solid formulations of the present invention comprise anhydrous sodium sulphate as weighting agent.

In the solid formulation of the present invention, the weighting agent may be present in an amount of less than 20% by weight based on the total weight of said formulation.

In the solid formulation of the present invention, the weighting agent may be preferably present in an amount comprised from 5% to 20% by weight based on the total weight of said formulation.

According to an embodiment, the solid formulation of the present invention further comprises at least one secondary surfactant, said secondary surfactant being different from the primary surfactant.

Secondary surfactants may be blended with the primary surfactant to optimize the foam performance.

In the present invention, the secondary surfactant (or co-surfactant) may be chosen from the group consisting of: amphoteric, anionic, cationic and non-ionic surfactants.

According to a preferred embodiment of the present invention, the amphoteric surfactant is chosen from the group consisting of: alkyl amidopropyl sultaines, (C8-C18) alkyl amidopropyl betaines, alkyl amphohydroxypropyl sulfonates, alkyl ampho(di)acetates, and mixtures thereof.

The formulations of the invention may include up to 10-15% w/w of such an amphoteric surfactant (or low active surfactant) without any loss in the mechanical strength of the soap stick. Spray dried, optimized blends of amphoteric surfactants may be used to enhance the performance of the soap stick.

According to a specific embodiment of the present invention, suitable i.a. when the primary surfactant is amphoteric (e.g. when said surfactant is a betaine such as lauramidopropyl betaine), the anionic surfactant is chosen from the group consisting of: acyl taurates, acyl sarcosinates, alkyl ether carboxylic acids, alkyl or alkyl ether phosphate esters, fatty acid isethionates, acyl glutamates, fatty acids, lecithins, e.g soy or sunflower, linear alkyl benzene sulfonates, α-olefin sulfonates, and mixtures thereof.

These anionic surfactants are commercially available as spray dried high active powders. Inclusion of 1% to 4% w/w anionic surfactant (e.g. sodium α-olefin sulfonate or natural phospholipids such as soy or sunflower lecithin was found to improve the dispersion of the high active powdered surfactant. Fatty acid salts (carboxylates) such as alkali metal stearates may be included as binding agents.

According to a preferred embodiment of the present invention, the non-ionic surfactant is chosen from the group consisting of: fatty acid (C12-C18)alkanolamides, alkyl ethoxylates, sorbitan esters, glyceryl fatty acid esters, glycol fatty acid esters, alkyl polyglucosides, and mixtures thereof.

Surfactants of interest are those based on the following hydrophobes such as coconut, lauric, myrstic, cetyl, stearic, oleic, ricinolenic, castor or behenic fatty acids and have a wide HLB range, c.a. 1-20. The surfactants with low HLBs are primarily used as wetting agents to aid the dispersal of the solid surfactant in the molten organic phase, e.g. sorbitan mono- or trioleates. High melting point surfactants such as those based on high molecular weight fatty alcohol or fatty acid ethoxylates (e.g. cetareth-50 and PEG-40 castor oil) and alkanolamides (e.g. oleic acid or tall oil derivatives) may be used as binding agents in the solid foam stick. Alcohol ethoxylates with high EO contents also helped to improve the foam stability in the presence of high TDS (total dissolved solids) brines.

According to a preferred embodiment, the formulation of the present invention may comprise a cationic surfactant. Biodegradable ester quaternaries may be added to the formulation to boost foam performance in high condensate loaded wells and to provide additional benefits such as corrosion inhibition. Their inclusion may be permitted since they are compatible with the surfactant base (amphoteric and nonionic).

The solid formulation of the present invention may also further comprise at least one chelating agent such as citrates and iminosuccinates, preferably in a solid form. Such a chelating agent may be added to minimise the risk of formation of oilfield scales as a result of using the soap stick formulation.

According to a specific embodiment, the solid formulation of the present invention comprises at least one antioxidant chosen from vegetable waxes and natural soap bases, and mixtures thereof.

The soap stick may include antioxidants to prevent discolouration of the binding agent (vegetable waxes and natural soap bases) during storage. Examples of antioxidants are butylated hydroxy anisole (BHA), butylated hydroxy toluene (BHT), tertiary butyl hydroxyquinone (TBHQ), gallic acid esters (e.g. propyl and butyl gallates) and pentaerythrityl tetra-di-t-butyl hydroxyhydrocinnamate.

When the solid formulation comprises an antioxidant, its amount is comprised from 0.01% to 0.05% by weight based on the total weight of said formulation. The solid formulation of the present invention may also comprise at least one further ingredient, chosen from:
- oil soluble preservatives such as tocopherol acetate;
- demulsifiers such as EO/PO alkoxylates, e.g. glycerol, polyimines and polyamines, polyols, alkylphenol formaldehyde and epoxy resins;
- defoamers, such as EO/PO block copolymers, polydimethylsilioxanes, fatty acid esters, in particular glyceryl fatty acid esters such as capryl/capyrilic triglycerides and pentaerythrityl esters;
- effervescing agents, such as citric acid, aspartic acid or alkali metal bicarbonate mixtures;
- rheology modifiers, such as organophilic clays and hydrophobically modified silica;
- sequestrants, such as tetrasodium iminosuccinate;
- wetting agents such as sorbitan ester or alcohol ethoxylate,
- and mixtures thereof.

Demulsifiers may be included in the formulation to aid the separation of the hydrocarbons from the aqueous brine phase and to provide additional foam control in the gas separator. The pressure drop in the gas separator permits the release of the lighter hydrocarbon fractions (i.e. methane) from the fluids but the presence of the surfactant (foamer) may cause excessive foaming problems or 'foam lock', causing blockages in pumps and gas dehydrators, i.e. gelling of glycols (e.g. triethylene glycol)) used to remove water from the gas phase.

For situations where the temperature is below the melting point of the binding agent, the incorporation of effervescing agents such as a 1:1 organic acid (citric or aspartic acid) and alkali metal bicarbonate mixtures will facilitate the fragmentation of the solid soap stick. Rheology modifiers such as organophilic clays and hydrophobically modified silica may be added to the molten wax to suspend the solids and prevent sedimentation. The shear thinning behaviour produced by the additives permits the dispensing of the molten formulation into the moulds.

According to an advantageous embodiment, the solid formulation of the present invention comprises at least one further active ingredient, chosen from: scale and/or halite inhibitors. Especially, scale inhibitors suitable for oilfield applications may be used, such as polycarboxylates e.g. polyaspartate, phosphonates, polysulfonates and its copolymers, e.g. salts of vinyl sulfonic acid (VS), styrene sulfonic acid (SSA), alkyloxy-2-hydroxypropylsulfonic acid or acrylamido (methylpropyl) sulfonic acid (AMPS), succinates, citrates and end capped vinyl copolymers. Suitable halite inhibitors include inhibitors suitable for oilfield applications, such as hexacyanoferrates, nitrilotrialkanamides or sulfonated polycarboxylate copolymers, that are suitable for applications where brines have high salinities.

The formulation of the invention may also include corrosion inhibitors such as phosphate esters.

The formulations may also optionally contain biocides such as THPS (tetrakis-hydroxymethylphosphonium salts).

The formulation may especially contain a mixture of scale and/or halite inhibitors, and/or corrosion inhibitors and/or biocides.

The formulations of the present invention may also comprise brine lubricants (friction reducers) such as modified natural oils (esters) to adjust the viscosity of the melt (binding agents base) and as a carrier for oil soluble ingredients such as scavengers.

Adding solids to the molten base can cause aeration and produce a low density solid which may easily fragment. Addition of suitable processing aids (i.e. defoamers) will help to de-aerate molten formulation. Examples include EO/PO block copolymers, polydimethylsilioxanes and fatty acid esters. Glyceryl esters such as capryl/capyrilic triglycerides and pentaerythrityl esters were preferred as defoaming agents.

The present invention also relates to a process of preparation of the solid formulation as defined above, wherein the primary surfactant is added to a molten composition comprising the binding agent and the dispersant.

According to an embodiment, if the solid formulation also comprises one or several further components chosen from the weighting agent, the secondary surfactant, the chelating agent, the antioxidant, the further ingredient and the active ingredient, the process of the present invention consists in adding the primary surfactant to a molten composition comprising the binding agent and the dispersant, as well as said further component(s).

According to an advantageous embodiment, the process of the present invention comprises the following steps:
- a step for preparing the molten composition comprising the binding agent and the dispersant;
- a step for adding the primary surfactant to said molten composition, in order to obtain a molten formulation;
- a step for mixing said formulation and for pouring it into moulds; and
- a step for allowing the formulations to set at ambient temperature.

The sticks are prepared by heating the materials until they are molten, blended, and cast into the appropriate shaped moulds to cool and solidify.

According to a preferred embodiment, the surfactants were added slowly to the molten wax base (at a temperature of about 80-90° C.) containing the dispersants with stirring to avoid aeration. Preferably, the powders are added in small amounts to prevent the wax base from cooling down and setting. An increase in the viscosity of the formulation was observed when it started to set and the temperature was preferably allowed to increase in order to melt the base. When the remaining ingredients (weighting agents and chelants) had been added to the base and mixed thoroughly, the hot melt was carefully poured into the moulds. The formulations were allowed to set at ambient temperature. Highly aerated compositions may produce a solid with a low specific gravity, reduced hardness and therefore liable to fracture or shatter when subjected to mechanical stresses. Aeration was kept to a minimum by stopping the stirrer after the addition of the solids to allow any entrained air released from wetting of the substrate or mixing to escape.

The preferred addition order for the solid formulation of the present invention is given in the following table.

| Addition Order | Component |
|---|---|
| 1 | Binding agent |
| 2 | Dispersant |
| 3 | Primary surfactant (in particular lauramidopropyl betaine) |

According to a specific embodiment, when the solid formulation comprises also a wetting agent, a dispersant, a defoamer, a co-surfactant, a weighting agent and a sequestrant, the addition order is as follows:

| Addition Order | Component |
|---|---|
| 1 | Vegetable wax, polyethylene glycol (carbowax) or soap base—binding agent |
| 2 | Alkanolamide or high mw alcohol ethoxylate—binding agent |
| 3 | Wetting agent |
| 4 | Dispersant |
| 5 | Defoamer |
| 6 | Primary surfactant (in particular lauramidopropyl betaine) |
| 7 | Co-surfactant |
| 8 | Weighting agent |
| 9 | Sequestrant |

According to an embodiment, the compositions were cast in moulds and allowed to cool to room temperature. The solid formulations were then released from the moulds for performance testing. Ice cube trays and spherical soap moulds (3.5-9.0 cm diameter supplied by The Soap Kitchen, Devon) were used to cast the solid foamer. The solid formulations prepared using the half-sphere moulds may be stuck together using the molten formulation or wax. A spherical product may also be obtained by storing the two halves at the congealing temperature for a short period of time before being allowed to set together. According to an advantageous embodiment, spherical moulds are employed to cast the soap stick on an industrial scale.

The present invention also relates to the use of the solid formulation as defined above for gas well deliquification applications.

The main function of the formulation of the invention is to deliver the foaming agent (primary surfactant) and other ingredients to the flooded perforation. Gas production is maintained by the production of foam to lift the trapped fluids to the surface. The solid matrix can also be used to trap inert particulates that promote the stability of the foam (reduce liquid drainage), especially in the presence of high levels of condensate.

The present invention also relates to the use of the solid formulation as defined above, comprising one active ingredient, chosen from: scale inhibitors, biocides, and corrosion inhibitors, as a carrier for the controlled release of the active ingredient.

The solid formulations of the present invention may also be used in other oilfield applications such as well completion; drilling mud removal (chemical wash) or to stimulate production. The formulations are also suitable for use in the production of natural gas trapped in sensitive formations (shales etc). Foamers are widely used in shale or tight gas applications to remove water from the well bore after it has been completed. The formulations may be used in oilfield pipeline applications as a corrosion inhibitor system or to limit microbial contamination with the delivery of a suitable biocidal active.

EXAMPLES

I—Preparation of Solid Formulations 10 solid formulations (A to J) were prepared and the compositions of these foam stick formulations are given in the following tables.

| Component | Formulations A (% w/w) | B (% w/w) |
|---|---|---|
| MACKAMIDE LMA ex Rhodia (binding agent) | 27 | 19.5 |
| PLURIOL E 1500 (PEG 1500 ex BASF) (binding agent) | — | — |
| PLURIOL E 4000 (PEG 4000 ex BASF) (binding agent) | — | — |
| Rapeseed wax (melting point ~65° C., ex Kerax, PothHille) (binding agent/mould release agent) | 4.2 | 5.6 |
| HYPERMER LP1 ex Croda Chemicals (Polymeric dispersant) | 2.8 | 3.7 |
| ALKAMULS S85 ex Rhodia (wetting agent) | 1.2 | 2.2 |
| MACKAM 1200 (85%) ex Rhodia (primary surfactant) | 60 | 54.7 |
| BAYPURE CX-100 (chelant/scale inhibitor) Tetrasodium iminosuccinate ex Lanxess | 4.8 | 3.4 |
| Anhydrous sodium sulphate (weighting agent) | — | 10.9 |
| Specific Gravity (Calculated) | 0.8 | 0.96 |

| Component | Formulations | | |
|---|---|---|---|
| | C (% w/w) | D (% w/w) | E (% w/w) |
| MACKAMIDE LMA ex Rhodia (binding agent) | — | 21.4 | 22 |
| TETRONIC RED 9040 ex BASF (dispersant and demulsifier) | 2.4 | — | — |
| PEG-150 Distearate, CUTINA DP S6 (ex Cognis) (wetting agent) | 5 | — | — |
| PLURIOL E 1500 (PEG 1500 ex BASF) (binding agent) | 35.1 | — | — |
| PLURIOL E 4000 (PEG 4000 ex BASF) (binding agent) | 6.5 | — | — |
| HOSTAPUR OSB (C13-15 α-olefin sulfonate powder (90%), ex Clariant) | — | 12.2 | 3.8 |
| Rapeseed wax (melting point ~65° C., ex Kerax, PothHille) (binding/mould release agent) | 3.2 | 4.4 | 3.8 |
| HYPERMER LP1, ex Croda Chemicals (Polymeric dispersant) | — | 3.2 | 2.8 |
| ALKAMULS S85 ex Rhodia (wetting agent) | — | 1.8 | 1.5 |
| VOLPO S2 (wetting agent), ex Croda Chemicals Steareth-2 | 2.8 | — | — |
| MACKAM 1200 ex Rhodia (primary surfactant) | 34 | 47.8 | 52 |
| BAYPURE CX-100 (chelant/scale inhibitor) Tetrasodium iminosuccinate, ex Lanxess | 5 | 3.2 | 4.6 |
| Anhydrous sodium sulphate (weighting agent) | 6 | 6.0 | 9.5 |
| Specific Gravity (Calculated) | 1.17 | 0.85 | 0.9 |

| Component | Formulations | | |
|---|---|---|---|
| | F (% w/w) | G (% w/w) | H (% w/w) |
| MACKAMIDE LMA ex Rhodia (binding agent) | 20 | 21 | 20.5 |
| PEG 4000, e.g. PLURIOL E 4000 (ex BASF) (binding agent) | 4.0 | 3.1 | 4.9 |
| Rapeseed wax (melting point ~65° C.), e.g. (ex Kerax, PothHille) (binding/mould release agent) | 4.7 | 3.8 | 3.9 |
| HYPERMER LP1, ex Croda Chemicals (Polymeric dispersant) | 3.2 | 2.8 | 3 |
| ALKAMULS S85 ex Rhodia (wetting agent) | 1.1 | 0.9 | 1.1 |
| HOSTAPUR OSB ex Clariant C13-15 α-olefin sulfonate powder (90%), | 1.1 | — | — |
| CRODASINIC LS95 ex Croda Chemicals Sodium Lauroyl Sarcosinate (94%). | — | 0.9 | — |
| GERAPON T42LQ ex Rhodia, | — | — | 3.9 |
| MACKAM 1200 ex Rhodia (80%) (primary surfactant), | 47.1 | 52.4 | 46.0 |
| BAYPURE CX-100 (chelant/scale inhibitor) Tetrasodium iminosuccinate, ex Lanxess | 2.3 | 1.8 | 2.1 |
| Anhydrous sodium sulphate (weighting agent) | 16.5 | 13.3 | 14.6 |
| Specific Gravity (Calculated) | 0.7 | 1.02 | 1.04 |

| Component | Formulations | |
|---|---|---|
| | I (% w/w) | J (% w/w) |
| MACKAM 1200 ex Rhodia (80%) (primary surfactant), | 54.95 | 57 |
| ALKAMULS S85 ex Rhodia (wetting agent) | 1.0 | — |
| RHODASURF ON870/E ex Rhodia (binding agent) | — | 5.0 |
| PEG-150 Distearate, e.g. CUTINA DP S6 (ex Cognis) (wetting agent) | — | 5.0 |
| Soy Lecithin powder (90% active), ex Camida (co-surfactant) | 2.0 | — |
| HYPERMER LP1, ex Croda Chemicals (Polymeric dispersant) | 4.0 | — |
| HYPERMER B261 Poly Fatty Acid EO block copolymer, ex Croda Chemicals (dispersant) | — | 4.0 |
| BAYPURE CX-100 (chelant/scale inhibitor) Tetrasodium iminosuccinate, ex Lanxess | 2.0 | 2.0 |
| Rapeseed wax (melting point ~65° C., ex Kerax, PothHille) (binding/mould release agent) | 24 | — |
| PLURIOL E 1500 (PEG 1500 ex BASF) (binding agent) | — | 22 |
| Anhydrous sodium sulphate (100%) (weigthing agent) | 12.0 | 5.0 |
| Tocopherol acetate, ex Merck KGaA (preservative) | 0.05 | — |
| Specific Gravity (Calculated) | ~1.05 | ~1.1 |

The specific gravity of the stick was estimated from the diameter of the spherical mould and weighing the stick.

Volume (half-sphere)=$\frac{1}{12} \pi d^3$, where d is the diameter of the mould.

$$\text{Density(stick)} = \frac{\text{weight of stick(g)}}{\text{volume}}$$

$$\text{Specific gravity} = \frac{\text{density of stick}}{\text{density of water}}$$

II—Dynamic Foam Tests

A—Methods

The liquid unloading performance of the formulations was assessed using a dynamic foam test apparatus (based on the Bikerman method (R J Pugh, Handbook of Applied Surface and Colloid Chemistry, Volume 2, Eds K Holmberg, D O Shah, M J Schwager, J Wiley & Sons (2002), Chapter 8) and ASTM 892 test).

A 50/50 v/v model brine and condensate (10% w/w sodium chloride and Isopar M (C11-15 iso-paraffins)) was heated to 80° C. in a 1000 ml, 6.0 cm jacketed glass column fitted with a foam generator and condenser to cool the liquid overflow recovered from the column. The fluid was collected in a 1000 ml graduated measuring cylinder. The mixture (~260 ml) was agitated by injecting nitrogen gas into the fluid at a low rate (less than 0.5 Litres/min) to heat the mixture to the test temperature. A 10% active solution (20 ml) of the solid foam stick in deionised water was prepared in sample vials. The solutions were stored at 80° C. until the formulation had completely dispersed. The foamer solution (1% active solution) was then added drop wise to the mixture in the dynamic foam test apparatus and allowed to disperse. The concentration of surfactant was equivalent to 1000 ppm in the test solution.

The gas flow rate was 1.0 Litres/min and the foam generated was allowed to overflow from the column into the measuring cylinder for 15 minutes. The weight of fluid collected was measured and it was then possible to calculate the liquid unloading efficiency. The volume of the recovered liquids (brine and condensate) was measured in order to determine whether the surfactants posed any risk of forming an emulsion.

B—Results

1. Liquid Unloading Performance

Liquid unloading performance of the foam sticks of the present invention was benchmarked against Mackam® DAB (lauramidopropyl betaine, amphoteric surfactant, Rhodia). The efficiencies were calculated from the amount of fluid recovered from the column.

$$\text{Liquid Unloading}(\%) = \frac{\text{Weight of fluid recovered from the column} \times 100}{\text{Total weight of fluid (brine + condensate)}}$$

The results of the dynamic foam tests are given in the following table.

| | Formulations | | | | | | | |
|---|---|---|---|---|---|---|---|---|
| Parameter | Control | A | B | C | E | F | G | H |
| Liquid total (g) | 244.8 | 242.4 | 242.3 | 243.5 | 242.9 | 242.6 | 241.8 | 243.1 |
| Liquid recovered (g) | 169.1 | 113.4 | 139.4 | 135.8 | 130.8 | 115.2 | 134.5 | 61.9 |
| Liquid unloading (%) | 70 | 46.8 | 57.5 | 55.8 | 53.9 | 47.5 | 55.6 | 25.5 |

The amount of condensate (% v/v) recovered from the column can be estimated from:

$$\text{Condensate recovered}(\%) = \frac{\text{Condensate volume} \times 100}{\text{Liquid recovered (total)}}$$

The results of the dynamic foam tests are given in the following table.

| | Formulations | | | | | | | |
|---|---|---|---|---|---|---|---|---|
| Parameter | Control | A | B | C | E | F | G | H |
| Liquid recovered total (ml) | 194 | 124 | 166 | 156 | 158 | 138 | 160 | 74 |
| Condensate (ml) | 110 | 80 | 86 | 98 | 108 | 90 | 104 | 39 |
| Condensate (% v/v) | 56.7 | 64.5 | 51.8 | 62.8 | 68.4 | 65.2 | 65 | 52.7 |

The liquid unloading efficiencies (w/w (%)) of the formulations were found to be slightly lower than those solely obtained with the betaine. This was not unexpected as the level of amphoteric surfactant present in the test solutions was much lower for the soap sticks compared to the control.

Furthermore, the soap sticks which yielded lower liquid unloading efficiencies (Formulations A, F and H) were found to recover a higher level of condensate, a valuable revenue stream, compared to the control. This is advantageous as the volume of discharge water produced after separation of the condensate is reduced.

2. Emulsification Potential

The emulsification risk posed by the soap sticks was assessed by measuring the volume of the emulsion formed at the interface between the brine and the model condensate.

$$\text{Emulsion}(\% \ v/v) = \frac{\text{Emulsion layer} \times 100}{\text{Volume of liquid recovered}}$$

The results of the dynamic foam tests are given in the following table.

| | Formulations | | | | | | | |
|---|---|---|---|---|---|---|---|---|
| Parameter | Control | A | B | C | E | F | G | H |
| Liquid total (ml) | 194 | 124 | 166 | 156 | 158 | 138 | 160 | 74 |
| Interface layer (ml) | 4 | 2 | 14 | 0.5 | 1 | 1 | 4 | 5 |
| Emulsion (%) | 2.1 | 1.6 | 8.4 | 0.3 | 0.6 | 0.7 | 2.5 | 6.8 |

Several formulations were observed to pose a potential emulsification risk owing to the presence of an anionic surfactant. In such an embodiment, a demulsifier (nonionic surfactant) is added to the soap stick to facilitate the separation of the hydrocarbons from the recovered fluids. This was illustrated by the PEG formulation (Formulation C) which contained a demulsifier and only produced a trace amount of emulsion (<0.5% v/v of the recovered fluid). The alkanolamides used as the structurant increased the activity of the soap stick and was primarily used as a foam stabiliser. The surfactant improves foam stability by forming a packed monolayer at the gas liquid interface with the amphoteric and retards the drainage of fluid from the liquid lamellae by increasing the surface viscosity.

III—Dissolution Tests

A—Methods

A test was devised to evaluate the dissolution properties of the formulation. A 5% NaCl solution (pH~7) was heated to 80° C. and the soap stick added to the brine. The amount of soap stick added to the solution was equivalent to 1000-5000 ppm active surfactant when the solid had completely dissolved. The solution was stirred at a low agitation rate (150 rpm) and the time taken for the formulation to dissolve or disperse was noted. The pH of the solution was also measured to determine whether the formulation will change the brine chemistry (scale problems).

The specific gravity of the stick was important because low density solids tended to float on the surface of the brine solution and took longer to disperse.

B—Results

The results of the dissolution tests to obtain a 5000 ppm active dispersion in 5% w/w NaCl at 80° C. are given in the following table for selected formulations.

| Parameter | A | B | C | E | F | H |
|---|---|---|---|---|---|---|
| Dissolution time (minutes) | 120 | 120 | 15* | 95 | 120 | 90 |
| pH (100%) | 8.83 | 7.53 | 8.52 | 7.08 | N/A | 6.4 |

*Formulation was molten at 80° C. and therefore indicates a higher melting point wax is required to ensure the formulation does not soften or congeal on storage at elevated temperatures. Slight risk soap stick would probably melt before it reached the perforations.

The invention claimed is:

1. A process for gas well deliquification, the process comprising preparing a solid formulation comprising a primary surfactant, at least one binding agent, and at least one dispersant, wherein
    the primary surfactant is an amphoteric surfactant;
    the dispersant is a polymeric surfactant chosen from the group consisting of:
        hyperbranched polymers, poly fatty acid esters, ethylene oxide block copolymers of poly fatty acid, polymers based on polyisobutylene succinic anhydride and mixtures thereof; and wherein the preparing step comprises adding the primary surfactant to a molten composition comprising the binding agent and the dispersant, and injecting the solid formulation into a gas well.

2. The process of claim 1, wherein the primary surfactant is selected from the group consisting of: alkyl amidopropyl sultaines, (C8-C18)alkyl amidopropyl betaines, alkyl amphohydroxypropyl sulfonates, alkyl ampho(di)acetates, and mixtures thereof.

3. The process of claim 2, wherein the primary surfactant is selected from the group consisting of (C8-C18) alkyl amidopropyl betaines.

4. The process of claim 3, wherein the primary surfactant is or contains lauramidopropyl betaine.

5. The process of claim 1, wherein the binding agent is selected from the group consisting of: C16-C24 fatty alcohols, C16-C24 fatty alcohol ethoxylates, fatty acid alkanolamides, fatty acids, natural waxes and resins, high molecular weight polyethylene glycols, polyethylene waxes, mineral and petrolatum waxes, microcrystalline waxes, and mixtures thereof.

6. The process of claim 1, wherein the molten composition further comprises a weighting agent selected from the group consisting of: barium sulphate, sodium sulfate, calcium carbonate, dolomite, water-soluble salts of alkali metals, and mixtures thereof.

7. The process of claim 1, wherein the molten composition further comprises a secondary surfactant that is different from the primary surfactant and is selected from the group consisting of: amphoteric, anionic, cationic and non-ionic surfactants.

8. The process of claim 7, wherein the secondary surfactant is an amphoteric surfactant selected from the group consisting of: alkyl amidopropyl sultaines, (C8-C18)alkyl amidopropyl betaines, alkyl amphohydroxypropyl sulfonates, alkyl ampho(di)acetates, and mixtures thereof.

9. The process of claim 7, wherein the secondary surfactant is an anionic surfactant selected from the group consisting of: acyl taurates, acyl sarcosinates, alkyl ether carboxylic acids, alkyl or alkyl ether phosphate esters, fatty acid isethionates, acyl glutamates, fatty acids, lecithins, linear alkyl benzene sulfonates, α-olefin sulfonates, and mixtures thereof.

10. The process of claim 7, wherein the secondary surfactant is a non-ionic surfactant selected from the group consisting of: fatty acid (C12-C18)alkanolamides, alkyl ethoxylates, sorbitan esters, glyceryl fatty acid esters, glycol fatty acid esters, alkyl polyglucosides, and mixtures thereof.

11. The process of claim 1, wherein the molten composition further comprises a chelating agent selected from the group consisting of citrates and iminosuccinates.

12. The process of claim 1, wherein the molten composition further comprises an antioxidant selected from the group consisting of vegetable waxes and natural soap bases.

13. The process of claim 12, wherein the molten composition further comprises an antioxidant selected from the group consisting of butylated hydroxy anisole, butylated hydroxy toluene, tertiary butyl hydroxyquinone, gallic acid esters, pentaerythrityl tetra-di-t-butyl hydroxyhydrocinnamate, and mixtures thereof.

14. The process of claim 1, wherein the molten composition further comprises
an active ingredient selected from the group consisting of:
scale inhibitors,
halite inhibitors,
corrosion inhibitors,
biocides, and
mixture thereof.

15. The process of claim 14, wherein the scale inhibitor is suitable for oilfield applications and is selected from the group consisting of polycarboxylates phosphonates, polysulfonates and its copolymers, succinates, citrates and end capped vinyl copolymers;
wherein the halite inhibitor is suitable for oilfield applications and is selected from the group consisting of hexacyanoferrates, nitrilotrialkanamides and sulfonates polycarboxylate copolymers; wherein the corrosion inhibitor is selected from the group consisting of phosphate esters; and wherein the biocide is THPS.

16. The process of claim 1, wherein the process comprises:
preparing the molten composition comprising the binding agent and the dispersant;
adding the primary surfactant to said molten composition, in order to obtain a molten formulation;
mixing said formulation and pouring it into molds; and
allowing the formulation to set at ambient temperature.

* * * * *